(12) United States Patent
Bronner et al.

(10) Patent No.: US 8,260,323 B1
(45) Date of Patent: Sep. 4, 2012

(54) UTILIZATION OF EXISTING NETWORK INFRASTRUCTURE TO PROVIDE PERSON TRACKING CAPABILITIES

(75) Inventors: Peter Eyolf Bronner, Mohnton, PA (US); Dwight David Daugherty, Ephrata, PA (US); Roger A. Fratti, Shillington, PA (US)

(73) Assignee: Agere Systems Inc., Allentown, PA (US)

( * ) Notice: Subject to any disclaimer, the term of this patent is extended or adjusted under 35 U.S.C. 154(b) by 1159 days.

(21) Appl. No.: 11/065,982

(22) Filed: Feb. 24, 2005

(51) Int. Cl.
*H04W 24/00* (2009.01)
*H04B 7/00* (2006.01)

(52) U.S. Cl. .................................. 455/456.6; 455/41.2

(58) Field of Classification Search ............... 455/404.2, 455/456, 440, 41.2, 41.3, 456.6; 340/988–996, 340/12.5–12.54; 342/450–465; 370/331
See application file for complete search history.

(56) References Cited

U.S. PATENT DOCUMENTS

| | | | |
|---|---|---|---|
| 4,495,496 A | 1/1985 | Miller, III | |
| 4,998,095 A | 3/1991 | Shields | |
| 5,542,100 A | 7/1996 | Hatakeyama | |
| 5,764,283 A | 6/1998 | Pingali et al. | |
| 5,973,732 A | 10/1999 | Guthrie | |
| 6,150,921 A | 11/2000 | Werb et al. | |
| 6,327,535 B1 | 12/2001 | Evans et al. | |
| 6,362,778 B2 | 3/2002 | Neher | |
| 6,374,177 B1 | 4/2002 | Lee et al. | |
| 6,396,438 B1 | 5/2002 | Seal | |
| 6,424,264 B1 | 7/2002 | Giraldin et al. | |
| 6,477,156 B1 | 11/2002 | Ala-Laurila et al. | |
| 6,535,493 B1 | 3/2003 | Lee et al. | |
| 6,581,025 B2 | 6/2003 | Lehman | |
| 6,639,516 B1 | 10/2003 | Copley | |
| 6,674,403 B2 | 1/2004 | Gray et al. | |
| 6,741,863 B1 | 5/2004 | Chiang et al. | |
| 6,747,562 B2 * | 6/2004 | Giraldin et al. | ............. 340/573.1 |
| 6,963,289 B2 * | 11/2005 | Aljadeff et al. | ................. 340/8.1 |
| 7,748,021 B2 * | 6/2010 | Obradovich | ................... 725/105 |
| 2002/0069031 A1 | 6/2002 | Lehman | |
| 2002/0119770 A1 | 8/2002 | Twitchell, Jr. | |
| 2002/0174367 A1 | 11/2002 | Kimmel et al. | |
| 2003/0043073 A1 | 3/2003 | Gray et al. | |
| 2003/0117316 A1 | 6/2003 | Tischer | |

(Continued)

OTHER PUBLICATIONS

Daniel L. Lough, T. Keith Blankenship, Kevin J. Krizman, "A Short Tutorial on Wireless LANs and IEEE 802.11", The Bradley Department of Electrical and Computer Engineering, Virginia Polytechnic Institute and State University, Blacksburg VA, Summer 1997.

*Primary Examiner* — Melody Mehrpour
*Assistant Examiner* — Emem Stephen

(57) ABSTRACT

A tracking/locating/paging system utilizes a "pre-established" local area network to determine essentially real-time information regarding one or more client devices within a closed communication environment ("pre-established" also considered as including an ad hoc network connection of devices deployed to serve a common interest). Particularly suited for arrangements such as an amusement park, college campus, shopping mall, etc., the service of the present invention utilizes conventional client devices and includes the ability to transmit an identification signal unique to each device. Various network access points distributed through the closed environment receive these unique identification signals and can therefore pinpoint the location of various client devices in real time. Accordingly, a paging function may be added to further enhance the communication aspects of the tracking and locating features of the present invention.

13 Claims, 1 Drawing Sheet

U.S. PATENT DOCUMENTS

| | | |
|---|---|---|
| 2003/0131023 A1 | 7/2003 | Bassett et al. |
| 2003/0186710 A1* | 10/2003 | Muhonen et al. .......... 455/456.5 |
| 2004/0081139 A1 | 4/2004 | Beckmann et al. |
| 2004/0103278 A1 | 5/2004 | Abhishek et al. |
| 2004/0105529 A1 | 6/2004 | Salvucci et al. |
| 2005/0030377 A1* | 2/2005 | Li ................................. 348/143 |
| 2006/0105783 A1* | 5/2006 | Giraldin et al. ............ 455/456.3 |

* cited by examiner

UTILIZATION OF EXISTING NETWORK INFRASTRUCTURE TO PROVIDE PERSON TRACKING CAPABILITIES

TECHNICAL FIELD

The present invention relates to the provision of a person tracking/locating system and, more particularly, to the use of an existing network infrastructure to provide this tracking/locating system.

BACKGROUND OF THE INVENTION

Systems and equipment necessary for tracking one or more individuals, in real time and within a defined environment (such as, for example, a hospital complex, theme park, shopping mall, etc) provides several challenges. The system should be able to distinguish between different individuals within a defined group (for example, between different family members at a theme park) as well as be able to separately track each individual's movement and particular location at a moment's notice (if, for example, the members should become lost or separated). For this purpose, the system should provide convenient access anywhere within the environment—no matter how large the defined environment is.

Systems and equipment for tracking the location of moving objects in real time have been described in the art. For example, U.S. Pat. No. 5,764,283 discloses a "real time" method and apparatus for obtain spatial-temporal tracking corresponding to the movement of people from a continuous video stream containing video data. A clustering technique is used for tracking, in real time, "moving people" as they are represented by images obtained from the continuous video stream. Such a video-directed approach, however, is considered as suited only for tracking individuals in a very limited space, such as at the threshold of a store.

Another group of prior art systems use a type of "tagging" device, the device being associated with an individual upon entering the defined environment and thereafter periodically transmitting a beacon "identification signal". U.S. Pat. Nos. 6,424,264 and 6,747,562 illustrate the use of such identification tags in the environment of an amusement park. Each tag includes a long range transmitter for "chirping" its particular identification signal at a predetermined rate (every few seconds, or so, for example) and a short-range passive component including a memory element with complete identification information for the individual. The information in this memory element may be used at a configured communication point (e.g., kiosk) to "locate" other members of the individual's group. In order to function at an optimum level, the closed environment must include a rather large number of receivers for the chirping ID signals (the number/location of receivers thus influencing the accuracy of the location information), as well as a fairly large number of kiosks at which an individual user may submit a "locate" request or a request identifying himself as "lost". Given the number and complexity of other systems that are provided throughout such an environment, the equipment and space, maintenance, etc required for yet an additional overlaid communication system may be cost prohibitive.

Another problem remaining with the identification tag locating/tracking system is that the system is purely passive. There is no ability to communicate between individuals within a particular group. Thus, if a mother uses the system to locate her daughters within a particular store at a shopping mall, by the time the mother traverses the mall to reach that store, the daughters have moved on. The added ability to communicate/page with the other group members (e.g., "stay right there—I'm on my way over to you") would be a significant benefit.

SUMMARY OF THE INVENTION

The need remaining in the prior art is addressed by the present invention, which relates to the provision of a person tracking/locating system and, more particularly, to the use of an existing network infrastructure to provide this tracking/locating system.

In accordance with the present invention, a system is developed for providing real time information regarding the location of specific individuals within a closed local area network communication environment being served by an in-place local area communication network. The system includes a plurality of mobile client communication devices, each mobile client communication device for transmitting a unique identification ("ID") signal in a periodic manner, with at least one mobile client communication device defined as a tracker client device and including the ability to interrogate the local area network to determine the real-time location of each client device associated with its defined group of client devices and a plurality of network access points responsive to the unique identification signals transmitted by the plurality of mobile client communication devices for identifying and determining the location of various ones of the plurality of mobile client communication devices.

In one embodiment of the present invention, the network may utilize the IEEE 802.11 communication standard and conventional wireless devices employing this standard. Alternatively, a cellular-based network standard and devices may be used. Indeed, it is contemplated that within a local area, a hand-off between networks may be utilized with a particular set of mobile devices.

In another embodiment of the present invention, the tracking capability may be enhanced to include paging services, allowing the group individuals to communicate over the network using the client devices. Thus, a father may page all of his children to "meet me at the castle at four o'clock" in real time, as plans change during the course of the day.

The tracking system of the present invention is equally applicable to performing this service for hunters, hikers, etc. in a large forest or national park, for tracking individual livestock within a herd, etc. Essentially, the tracking/locating/paging service of the present invention is applicable for use in any closed environment that is served by a local area network (LAN) communication system.

Indeed, other and further uses for the system of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
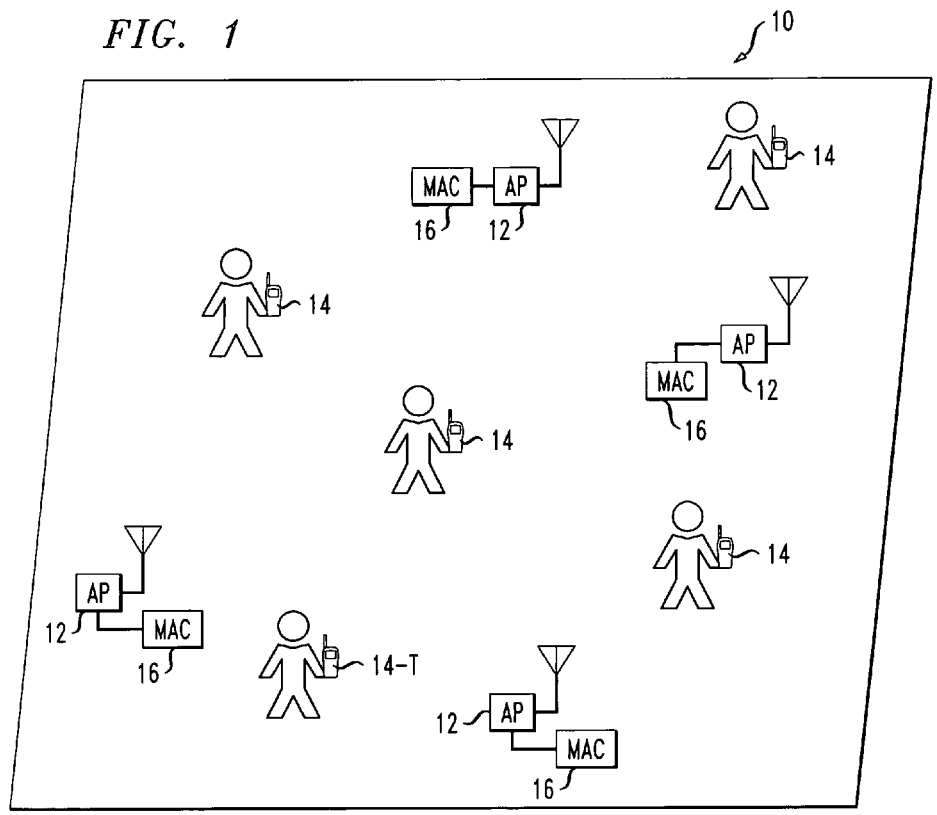
FIG. 1 illustrates a first closed environment for utilizing the wireless locating/paging service of the present invention.

Communications with wireless devices has quickly become a ubiquitous part of modern life. Such wireless devices can take any of a number of different forms. As examples, wireless devices may include cellular telephones and pagers, as well as various types of Internet, Web or other network-enabled devices, such as personal digital assistants (PDAs). Rapid growth has come in the mobile telephone realm and in the realm of other personal and business computing devices. The number of cellular telephone customers, for example, has grown exponentially over the past few years, as has the number of wireless personal and business computing devices. Any of these network-enabled devices may include Internet or Web functionality. Generally, a wireless device configured for transmitting, receiving accessing or exchanging data via a network will be referred to hereinafter as a "client device" or a "mobile client device", and communications between such mobile client devices as "wireless communications".

In the personal and business realm, where wireless communication can take place in a localized area via a local communication network, the IEEE 802.11 standard, referred to above, has been prevalent. As mentioned above, other types of mobile communication networks (such as, for example, cellular communication network) may utilize the capabilities of the present invention. A localized area, for the purposes of the present invention, may be a building, an area within a building, an area comprising several buildings, outdoor areas, or a combination of indoor and outdoor areas (such as an amusement park). For the purposes of the present invention, any of these localized areas will be defined as a "closed communication environment".

In accordance with the present invention, a pre-existing wireless local area network (such as an IEEE 802.11-based wireless local area standard) presently used on college campuses, small business locations, or the like can be supplemented to provide the desired tracking/locating/paging functions without the need to install a separate network to overly the defined environment. Locations such as a hospital complex, amusement park, shopping mall, are all likely areas where a wireless communication local area network (such as an 802.11-based network) has been (or will be) implemented and can therefore easily implement the additional tracking functions of the present invention. Other types of wireless networks include, for example, the Family Radio Service (FRS) or General Mobile Radio Service (GMRS), and systems that in general include the capability for ad hoc deployment within an area, with one or more of the deployed mobile units functioning as an "access point" in terms of possessing one or more of the requisite direction determining, location determining and capability to solicit information about one mobile from other mobile units.

In particular, the system of the present invention utilizes a number of "client devices" (i.e., mobile wireless transceivers) and number of stationary network "access points" distributed throughout the closed environment. These "access points" are conventionally used as the gateways into a wireless communication network, but in the case of the present invention, these "access points" are used to determine the location of each individual carrying a wireless client device. Each client device is configured to emit a separate RF identification signal (similar to the ID tags of the prior art), and will transmit its unique RF identification signal at a set interval (for example, on the order of seconds). A media access controller (MAC) within a receiving access point includes software for processing the received signal and defining the location of the identified client device. A group leader (parent), also having a client device, can request the location of various individuals within his/her group (without the need to seek out a kiosk providing such service), where the access point nearest the group leader will collect the group's location information from the other access points and forward the information to the parent's client device.

FIG. 1 illustrates an exemplary closed environment 10 (such as, for example, a shopping mall, amusement park, hospital complex, college campus, and the like), which has been outfitted to include a wireless communication network. A significant advantage of the present invention is the ability to piggy-back the tracking/locating/paging functions onto the abilities of such a pre-existing wireless network, thus reducing the implementation cost of the inventive system. While the present invention is discussed in terms of the IEEE standard 802.11 wireless communication system, it is to be understood that the principles involved in providing the functions of the invention can be used with any appropriate wireless communication system, such as, for example, the FRS and GMRS systems mentioned above.

Referring to FIG. 1, closed environment 10 is shown as including a number of separate, disparately located "access points" 12. An access point is used in the wireless network as an entry point for an individual desiring to communicate with others through the network. In general, an access point is a communication port for a wireless device, where the communication occurs through an "air link" between the wireless device and the access point. The access points themselves are networked and able to share messages back and forth between each other. That is, the access points pass messages received from the wireless devices across the LAN to other servers, computers, applications, subsystems or systems, as appropriate. The access points are bi-directional so as to also transmit messages back to the wireless devices. Typically, the access points are coupled to one or more network servers, where the servers are used to manage the network message traffic flow. Thus and in accordance with the present invention, an access point has the abilities to determine "who" an individual client device is, and "where" that particular client device is located (as well as determining "what" type of client device the individual is using the access the wireless network).

A number of individuals are shown in FIG. 1, where each individual has a client device 14 associated with him/her. A "client device", as mentioned above, is simply a two-way wireless communication device suitable for use with the wireless network. For example, cell phones, PDAs, notebook computers, laptops, etc, are all examples of "client devices" that may be used in the practice of the present invention. Alternatively, in some deployments of the present invention, specific "client devices" 14 tailored to perform only the necessary functions associated with tracking/paging may be used, and thus distributed to individuals upon requesting the service. For example, an amusement park may provide a specific rudimentary client device to each individual within a group, the client device having only the basic transmit/receive functions (including the ability to receive a paging signal).

In one exemplary use of the present invention, a parent may be at an amusement park with a number of children under his/her care. Each child may be given a client device 14, where the parent is given a similar client device 14, the parent's device defined as the "tracker" client device 14-T, with the additionally capability of requesting and recording location information associated with the other client devices in his/her group. As mentioned above, each child's client device 14 will transmit its unique "Request to send" signal upon activation and at a predetermined rate thereafter (such as, for example, every 10 seconds). This signal will be picked up by the nearest access point 12 in closed environment 10 (with, perhaps, a weaker form of the signal also received by other relatively close access points in the network). A media access controller (MAC) 16 within access point 12 will determine the physical location of the transmitting client device 14 based on, for example, the strength of the received signal, and forward that information to the "tracker" client device 14-T.

Inasmuch as the arrangement of the present invention is employed in the existing capabilities of a wireless communication local area network, the service of the present invention may be expanded to include the ability to transmit a paging message to other group members. For example, "tracker" device 14-T may transmit a page to his associated client devices 14 that reads "meet at the front gate at 3 PM", to ensure that each child in the group knows what time to regroup and where they should be. Should an emergency develop, or weather changes alter the group's plans, another page may simply be transmitted to update the entire group. The term "page", as applied in the context of the present invention is intended to define the transmission of secure information between units, including: (1) transmitting a signal to a mobile unit to request an acknowledgement (sometimes referred to as a "ping"), confirming the existence of a particular unit, but the signal may not be usable for direction-finding; (2) transmitting a signal to a mobile unit (including but not limited to a target mobile unit to be found) or a fixed access point so as to request a location of a mobile unit with a unique identification (i.e., "polling"); or (3) sending a human-perceptible message in text or voice form.

Figure 2:
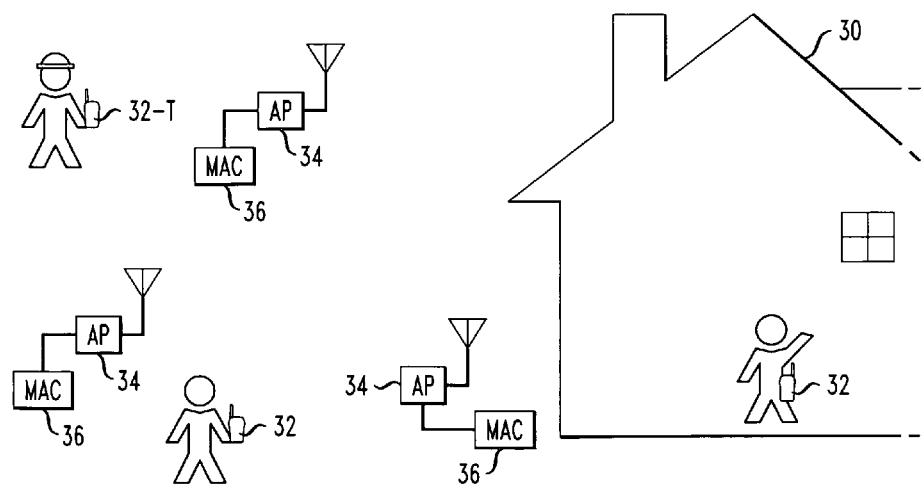
FIG. 2 illustrates a second type of closed environment, particularly suited for law enforcement activities such as "house arrest" or protection from abuse situations, which may also use the service of the present invention.

FIG. 2 illustrates an alternative type of environment for use of the tracking/locating/paging system of the present invention. In this case, an individual under "house arrest" must remain within a designated area 30 and is given a client device 32, a conventional wireless client device of the type discussed above. A number of wireless access points 34 are distributed throughout the neighborhood in association with the deployment of a wireless local area network for conventional communication purposes. In this embodiment of the present invention, when the individual leaves designated area 30, his associated client device 32, operating in normal fashion, will "ping" the closest access point 34 (i.e., will transmit its unique ID signal). A MAC 36 (or similar device) within access point 32 functions to match the identity of client device 32 with the particulars of the situation and, for example, transmit a client device "tracking" signal to a "tracker" client device 32-T associated with a police officer. This information can then be used by the police to locate the individual and/or transmit paging signals to others, as necessary. For example, in a protection from abuse situation, a paging message may be sent to a victim also in possession of a client device 32, alerting the victim to escape of the assailant.

Obviously, many other environments will find a use for this wireless tracking/locating/paging system of the present invention, particularly by virtue of its ability to utilize an in-place wireless network to provide these service features. Indeed, the scope of the present invention is intended to be limited only by the claims appended hereto.

What is claimed is:

1. A system for providing real time information regarding the location of specific individuals within a closed local area network communication environment, the closed environment being served by an in-place local area communication network, the system comprising:
   a plurality of mobile client communication devices, each mobile client communication device for transmitting a unique identification ("ID") signal in a periodic manner, at least one mobile client communication device defined as a tracker client device and including the ability to request and receive location information of each remaining client device associated with its defined group of client devices; and
   a plurality of network access points, each access point responsive to the unique identification signals transmitted by the plurality of mobile client communication devices for identifying and determining the location of various ones of the plurality of mobile client communication devices.

2. A system as defined in claim 1 wherein the plurality of mobile client communication devices within the closed environment further comprise the ability to transmit and receive paging signals.

3. A system as defined in claim 1 wherein the plurality of mobile client communication devices within the closed environment further comprise the ability to transmit and receive voice/text communications.

4. A system as defined in claim 1 wherein the in-place local area communication network comprises a wireless network.

5. A system as defined in claim 4 wherein the in-place wireless local area communication network utilizes the 802.11 communication protocol.

6. A system as defined in claim 1 wherein each access point includes a media access controller for determining the identity and location of each mobile client communication device.

7. A method for locating one or more mobile client devices within a closed communication environment service by a local area network, the method comprising the steps of:
   a) associating a unique identification signal with each mobile client device within a pre-defined group of client devices;
   b) each mobile client device including a transmitter for transmitting its unique identification signal;
   c) at least one access point in the closed communication environment receiving transmitted unique identification signals from the pre-defined group of client devices;
   d) determining, at the plurality of access points within the closed environment, the physical location of each client device within the pre-defined group based on the received unique identification signals; and
   e) upon request from a particular client device, transmitting the location information of the remaining devices within the pre-defined group to the requesting client device.

8. The method as defined in claim 7 wherein in performing step c), each module client device periodically transmits its unique identification signal.

9. The method as defined in claim 8 wherein in performing step c), each mobile client device transmits its unique identification signal at least once a minute.

10. The method as defined in claim 7 wherein in performing step c), each module client transmits its unique identification signal upon request from at least one access point.

11. The method as defined in claim 7 wherein the method is employed in a closed communication environment utilizing the 802.11 wireless communication standard.

12. The method as defined in claim 7 wherein the method further comprises the step of:
   f) transmitting a paging signal from a selected client device to the remaining devices within the pre-defined group.

13. The method as defined in claim 4 wherein the in-place local area communication network comprises at least two wireless communication standards.

* * * * *